US010929191B2

(12) United States Patent
Wang et al.

(10) Patent No.: US 10,929,191 B2
(45) Date of Patent: *Feb. 23, 2021

(54) LOADING MODELS ON NODES HAVING MULTIPLE MODEL SERVICE FRAMEWORKS

(71) Applicant: Advanced New Technologies Co., Ltd., Grand Cayman (KY)

(72) Inventors: Yueming Wang, Hangzhou (CN); Jiliang Li, Hangzhou (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/939,740

(22) Filed: Jul. 27, 2020

(65) Prior Publication Data

US 2021/0004269 A1 Jan. 7, 2021

Related U.S. Application Data

(63) Continuation of application No. 16/802,655, filed on Feb. 27, 2020, which is a continuation of application No. PCT/CN2020/071406, filed on Jan. 10, 2020.

(30) Foreign Application Priority Data

Jul. 3, 2019 (CN) .......................... 2019 1 0596970

(51) Int. Cl.
*G06F 15/16* (2006.01)
*G06F 9/50* (2006.01)
(Continued)

(52) U.S. Cl.
CPC ............ *G06F 9/505* (2013.01); *G06F 9/5044* (2013.01); *G06F 11/3442* (2013.01); *G06N 20/00* (2019.01)

(58) Field of Classification Search
CPC .................................. G06F 9/505; G06N 20/00
See application file for complete search history.

(56) References Cited

U.S. PATENT DOCUMENTS 8,527,973 B2 * 9/2013 Little ...................... G06F 8/453
717/149
9,430,280 B1 * 8/2016 Shih ...................... G06F 9/5005
(Continued)

FOREIGN PATENT DOCUMENTS

CN 107733977 2/2018
CN 107885762 4/2018
(Continued)

OTHER PUBLICATIONS

Crosby et al., "BlockChain Technology: Beyond Bitcoin," Sutardja Center for Entrepreneurship & Technology Technical Report, Oct. 16, 2015, 35 pages.
(Continued)

*Primary Examiner* — Hieu T Hoang
(74) *Attorney, Agent, or Firm* — Fish & Richardson P.C.

(57) ABSTRACT

This disclosure relates to model loading. In one aspect, a method includes determining, based on a preset execution script and resource information of multiple execution nodes, loading-tasks corresponding to the execution nodes. Each execution node is deployed on a corresponding cluster node. Loading requests are sent to the execution nodes, thereby causing the execution nodes to start execution processes based on the corresponding loading requests. The execution processes start multiple model service frameworks on each cluster node. Multiple models are loaded onto each of the model service frameworks. Each loading request includes loading-tasks corresponding to the execution node to which
(Continued)

the loading request was sent. The execution processes include a respective execution process for each model service framework.

20 Claims, 6 Drawing Sheets (51) Int. Cl.
*G06F 11/34* (2006.01)
*G06N 20/00* (2019.01)

(56) References Cited

U.S. PATENT DOCUMENTS

| | | | | |
|---|---|---|---|---|
| 9,720,732 | B1* | 8/2017 | Shih | G06F 9/50 |
| 9,836,671 | B2* | 12/2017 | Gao | G06F 40/30 |
| 9,916,540 | B2* | 3/2018 | Shoaib | G06N 20/00 |
| 10,115,032 | B2* | 10/2018 | Chandraker | G06K 9/00201 |
| 10,338,968 | B2* | 7/2019 | Bequet | G06N 20/00 |
| 10,733,531 | B2* | 8/2020 | Hammond | G06F 16/951 |
| 2010/0281166 | A1* | 11/2010 | Buyya | G06F 9/5072 709/226 |
| 2014/0229221 | A1* | 8/2014 | Shih | G06Q 10/06312 705/7.23 |
| 2015/0082271 | A1 | 3/2015 | Damonte et al. | |
| 2015/0378696 | A1* | 12/2015 | Boehm | G06F 8/45 717/149 |
| 2017/0063896 | A1* | 3/2017 | Muddu | G06F 3/04847 |
| 2017/0109205 | A1* | 4/2017 | Ahuja | G06F 9/505 |
| 2017/0149630 | A1* | 5/2017 | Feller | H04L 41/0893 |
| 2017/0261949 | A1* | 9/2017 | Hoffmann | G05B 13/0265 |
| 2018/0165554 | A1* | 6/2018 | Zhang | G06K 9/6256 |
| 2018/0219888 | A1* | 8/2018 | Apostolopoulos | H04L 63/1425 |
| 2018/0293488 | A1* | 10/2018 | Dang | G06N 3/088 |
| 2018/0293517 | A1* | 10/2018 | Browne | G06F 3/0482 |
| 2018/0357552 | A1* | 12/2018 | Campos | G06N 3/02 |
| 2019/0087383 | A1* | 3/2019 | Zhou | G06F 9/54 |
| 2019/0121889 | A1* | 4/2019 | Gold | G06F 3/061 |
| 2019/0146838 | A1* | 5/2019 | Zott | H04L 67/10 718/104 |
| 2019/0205745 | A1* | 7/2019 | Sridharan | G06F 9/5077 |
| 2019/0228303 | A1* | 7/2019 | Liu | G06F 9/5011 |
| 2019/0236153 | A1* | 8/2019 | Elliott | G06F 16/313 |
| 2019/0332441 | A1* | 10/2019 | Fachini | G06N 3/04 |
| 2019/0354628 | A1* | 11/2019 | Grunwald | G06F 11/2082 |
| 2019/0356609 | A1* | 11/2019 | Grunwald | G06F 11/2097 |
| 2020/0042362 | A1* | 2/2020 | Cui | G06F 9/5027 |
| 2020/0125568 | A1* | 4/2020 | Idicula | G06F 16/217 |

FOREIGN PATENT DOCUMENTS

| | | |
|---|---|---|
| CN | 107943794 | 4/2018 |
| CN | 109857475 | 6/2019 |
| CN | 110401700 | 11/2019 |

OTHER PUBLICATIONS

Nakamoto, "Bitcoin: A Peer-to-Peer Electronic Cash System," www.bitcoin.org, 2005, 9 pages.
PCT International Search Report and Written Opinion in International Application No. PCT/CN2020/071406, dated Mar. 25, 2020, 18 pages (with machine translation).

* cited by examiner

Determine, based on a preset execution script and resource information of several execution nodes, loading tasks corresponding to the execution nodes, where different execution nodes are deployed on different cluster nodes ⟵ 101

Send loading requests respectively to the several execution nodes, so that the execution nodes start several execution processes based on the corresponding loading requests, the several execution processes start several model service frameworks, and several models are loaded onto each of the model service frameworks, where the loading request includes the loading tasks corresponding to the execution nodes, and the execution processes are in one-to-one correspondence with the model service frameworks ⟵ 102

FIG. 1

Receive a loading request sent by a control node, where the loading request includes loading tasks corresponding to execution nodes, the loading tasks corresponding to the execution nodes are determined by the control node based on a preset execution script and resource information of several execution nodes, and different execution nodes are deployed on different cluster nodes ⟵ 201

Start several execution processes based on the loading request, so that the several execution processes start several model service frameworks, and several models are loaded onto each of the model service frameworks, where the execution processes are in one-to-one correspondence with the model service frameworks ⟵ 202

LOADING MODELS ON NODES HAVING MULTIPLE MODEL SERVICE FRAMEWORKS

CROSS-REFERENCE TO RELATED APPLICATIONS

This application claims the benefit of priority and is a continuation of U.S. patent application Ser. No. 16/802,655, filed Feb. 27, 2020, which is a continuation of PCT Application No. PCT/CN2020/071406, filed on Jan. 10, 2020, which claims priority to Chinese Patent Application No. 201910596970.5, filed on Jul. 3, 2019, and each application is hereby incorporated by reference in their entirety.

TECHNICAL FIELD

The present disclosure relates to the field of computer technologies, and in particular, to model loading.

BACKGROUND

With the rapid development of machine learning technologies, model prediction has become an important online service. To provide model prediction services, corresponding models need to be loaded into a cluster node in advance.

In some existing systems, only one model service framework is started on a cluster node, and several models are loaded through the model service framework. However, when an exception occurs to the model service framework, the cluster node on which the model service framework is located needs to be restarted. After the cluster node is restarted successfully, the model service framework is restarted, and the models that are already deployed on the cluster node are reloaded.

SUMMARY

In view of this, implementations of the present disclosure provide methods and systems, a control node, and an execution node for model loading, to improve system availability.

According to a first aspect, an implementation of the present disclosure provides a model loading method, including: determining, based on a preset execution script and resource information of several execution nodes, loading tasks corresponding to the execution nodes, where different execution nodes are deployed on different cluster nodes; and sending loading requests respectively to the several execution nodes, so that the execution nodes start several execution processes based on the corresponding loading requests, the several execution processes start several model service frameworks, and several models are loaded onto each of the model service frameworks, where the loading request includes loading tasks corresponding to the execution nodes, and the execution processes are in one-to-one correspondence with the model service frameworks.

According to a second aspect, an implementation of the present disclosure provides a model loading method, including: receiving a loading request sent by a control node, where the loading request includes loading task corresponding to execution nodes, the loading tasks corresponding to the execution nodes are determined by the control node based on a preset execution script and resource information of several execution nodes, and different execution nodes are deployed on different cluster nodes; and starting several execution processes based on the loading request, so that the several execution processes start several model service frameworks, and several models are loaded onto each of the model service frameworks, where the execution processes are in one-to-one correspondence with the model service frameworks.

According to a third aspect, an implementation of the present disclosure provides a control node, including: a determining unit, configured to determine, based on a preset execution script and resource information of several execution nodes, loading tasks corresponding to the execution nodes, where different execution nodes are deployed on different cluster nodes; and a sending unit, configured to send loading requests respectively to the several execution nodes, so that the execution nodes start several execution processes based on the corresponding loading requests, the several execution processes start several model service frameworks, and several models are loaded onto each of the model service frameworks, where the loading request includes loading tasks corresponding to the execution nodes, and the execution processes are in one-to-one correspondence with the model service frameworks.

According to a fourth aspect, an implementation of the present disclosure provides an execution node, including: a receiving unit, configured to receive a loading request sent by a control node, where the loading request includes loading tasks corresponding to execution nodes, the loading tasks corresponding to the execution nodes are determined by the control node based on a preset execution script and resource information of several execution nodes, and different execution nodes are deployed on different cluster nodes; and a starting unit, configured to start several execution processes based on the loading request, so that the several execution processes start several model service frameworks, and several models are loaded onto each of the model service frameworks, where the execution processes are in one-to-one correspondence with the model service frameworks.

According to a fifth aspect, an implementation of the present disclosure provides a model loading system, including the control node according to any one of the previous implementations and the execution node according to any one of the previous implementations.

At least one of the previous technical solutions used in the implementations of the present disclosure can achieve the following beneficial effects: In this method, several model service frameworks are started on each cluster node by an execution node deployed on different cluster nodes, and several models are loaded through each model service framework. In this method, several model service frameworks can be deployed on a cluster node; and when one model service framework is abnormal, the cluster node does not need to be restarted, and other model service frameworks in the cluster node can still work normally. As such, the system availability is improved.

BRIEF DESCRIPTION OF DRAWINGS

To describe the technical solutions in the implementations of the present disclosure or the existing technology more clearly, the following briefly introduces the accompanying drawings required for describing the implementations. Clearly, the accompanying drawings in the following description are merely some implementations of the present disclosure, and a person of ordinary skill in the art can still derive other drawings from these accompanying drawings without creative efforts.

DESCRIPTION OF IMPLEMENTATIONS

To make the objectives, technical solutions, and advantages of the implementations of the present disclosure clearer, the following clearly and comprehensively describes the technical solutions in the implementations of the present disclosure with reference to the accompanying drawings in the implementations of the present disclosure. Clearly, the described implementation are some but not all of the implementations of the present disclosure. All other implementations obtained by a person of ordinary skill in the art based on the implementations of the present disclosure without creative efforts shall fall within the protection scope of the present disclosure.

In the conventional model loading method, only one model service framework is started on a cluster node, and several models are loaded through the model service framework. Different models are loaded onto the same model service framework for deployment.

However, when the model service framework is abnormal, the cluster node on which the model service framework is located needs to be restarted. After the cluster node is restarted successfully, the model service framework is restarted, and the models that have been deployed on the cluster node are reloaded. In addition, the method is based on the machine granularity, that is, only one model service framework can be started on a cluster node, which leads to the waste of cluster node resources. Further, a plurality of computationally intensive models are loaded onto the same model service framework, which leads to resource preemption and affects service performance.

Figure 1:
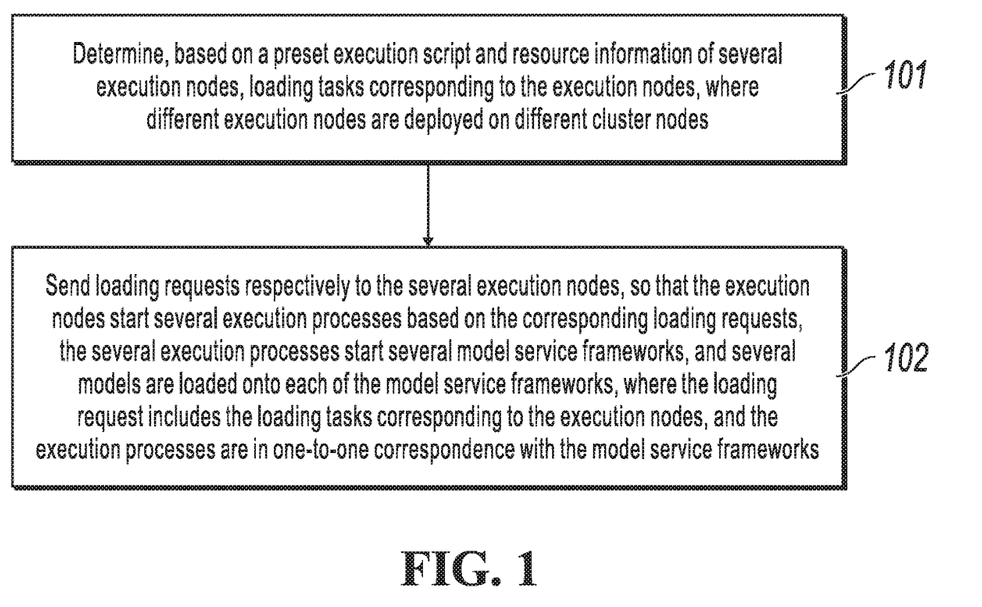
FIG. 1 is a flowchart illustrating a model loading method, according to an implementation of the present disclosure.

In view of this, implementations of the present disclosure provide a model loading method, where the method is applied to a control node. As shown in FIG. 1, the method can include the following steps:

Step 101: Determine, based on a preset execution script and resource information of several execution nodes, loading tasks corresponding to the execution nodes, where different execution nodes are deployed on different cluster nodes.

A cluster node is a unit in a cluster, has a relatively independent running environment, and can be at least one of a physical machine, a virtual machine, and a container.

An execution node is an independent process that is responsible for task scheduling of a node.

A control node is an independent process that coordinates task scheduling between different execution nodes globally.

An execution process is a user-level process that initiates a model service framework and manages the lifecycle of the model service framework.

A model service framework can be an HTTP framework or a Tensorflow framework, etc., where the Tensorflow framework is an open source machine learning framework. The following implementations are described by using the Tensorflow framework as an example.

The model service framework is started by an execution process, and is responsible for executing a specific prediction calculation request, for example, receiving feature data from a request, calculating a prediction score and then returning the prediction score.

Resource information of an execution node includes the quantity of CPU cores of the cluster node on which the execution node is located, and/or the remaining memory capacity of the cluster node on which the execution node is located.

For each node in the cluster, a service can be deployed on the cluster node by running a deployment script on the node. A procedure for deploying a service as follows: running a deployment script to deploy a control node, deploying an execution node on each cluster node, attaching each execution node to the control node, and reporting, by each execution node, resource information to the control node.

Determining, based on a preset execution script and resource information of several execution nodes, loading tasks corresponding to the execution nodes includes: determining the quantity of models corresponding to each execution node based on the total quantity of models declared in the execution script, resource information corresponding to each model, and resource information of the several execution nodes. That is, the loading tasks corresponding to the execution nodes include the quantity of models corresponding to the execution node. Certainly, the loading tasks corresponding to the execution nodes can also include the declaration about a model in the execution script and the declaration about a model service framework in the execution script.

The resource information corresponding to the model refers to the memory capacity corresponding to the model, that is, the memory capacity required to load the model.

It is worthwhile to note that model service frameworks declared in the execution script can be of a same or different types. Similarly, models declared in the execution script can be of a same or different types.

For example, when the declared model service frameworks are of different types, the models corresponding to each execution node and the quantity of the models are determined based on the total quantity of models of different types declared in the execution script, resource information corresponding to each model, and resource information of several execution nodes.

Step 102: Send loading requests respectively to the several execution nodes, so that the execution nodes start several execution processes based on the corresponding loading requests, the several execution processes start several model service frameworks, and several models are loaded onto each of the model service frameworks, where the loading request includes loading tasks corresponding to the execution nodes, and the execution processes are in one-to-one correspondence with the model service frameworks.

In this method, several model service frameworks are started on each cluster node by an execution node deployed on different cluster nodes, and several models are loaded through each model service framework. In this method, at least two model service frameworks can be deployed on a cluster node; and when one model service framework is abnormal, the cluster node does not need to be restarted, and other model service frameworks in the cluster node can still work normally. As such, the system availability is improved.

In an implementation of the present disclosure, one model is loaded onto each model service framework to reduce resource consumption.

Figure 2:
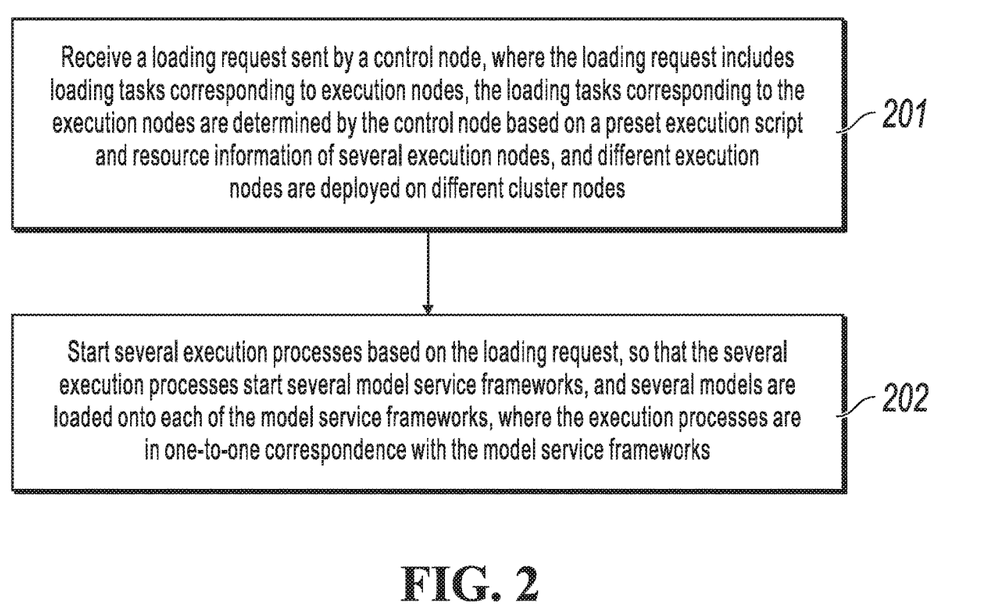
FIG. 2 is a flowchart illustrating a model loading method, according to another implementation of the present disclosure.

As shown in FIG. 2, an implementation of the present disclosure provides a model loading method, where the method is applied to an execution node and includes:

Step 201: Receive a loading request sent by a control node, where the loading request includes loading task corresponding to execution nodes, the loading tasks corresponding to the execution nodes are determined by the control node based on a preset execution script and resource information of several execution nodes, and different execution nodes are deployed on different cluster nodes.

Step 202: Start several execution processes based on the loading request, so that the several execution processes start several model service frameworks, and several models are loaded onto each of the model service frameworks, where the execution processes are in one-to-one correspondence with the model service frameworks.

In an implementation of the present disclosure, the loading request further includes a declaration about an execution process in an execution script; and Starting several execution processes based on the loading request includes: starting several execution processes based on a declaration about an execution process in the execution script.

In an implementation of the present disclosure, the loading request further includes a declaration about a model service framework in the execution script; and starting several model service frameworks by the several execution processes includes: starting, by the several execution processes, the several model service frameworks based on the declaration about a model service framework in the execution script.

In an implementation of the present disclosure, to further improve the system availability, the method further includes: when it is detected, through monitoring, that a target execution process in the several execution processes is lost, re-establishing the target execution process.

Figure 3:
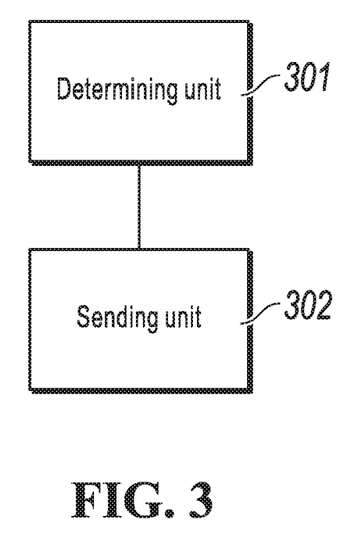
FIG. 3 is a schematic structural diagram illustrating a control node, according to an implementation of the present specification.

As shown in FIG. 3, an implementation of the present disclosure provides a control node, including: a determining unit 301, configured to determine, based on a preset execution script and resource information of several execution nodes, loading tasks corresponding to the execution nodes, where different execution nodes are deployed on different cluster nodes; and a sending unit 302, configured to send loading requests respectively to the several execution nodes, so that the execution nodes start several execution processes based on the corresponding loading requests, the several execution processes start several model service frameworks, and several models are loaded onto each of the model service frameworks, where the loading request includes loading tasks corresponding to the execution nodes, and the execution processes are in one-to-one correspondence with the model service frameworks.

In an implementation of the present disclosure, the determining unit 301 is configured to determine the quantity of models corresponding to each execution node based on the total quantity of models declared in the execution script, resource information corresponding to each model, and resource information of the several execution nodes.

In an implementation of the present disclosure, a cluster node includes at least one of a physical machine, a virtual machine, and a container.

In an implementation of the present disclosure, resource information of an execution node includes the quantity of CPU cores of the cluster node on which the execution node is located, and/or the remaining memory capacity of the cluster node on which the execution node is located.

Figure 4:
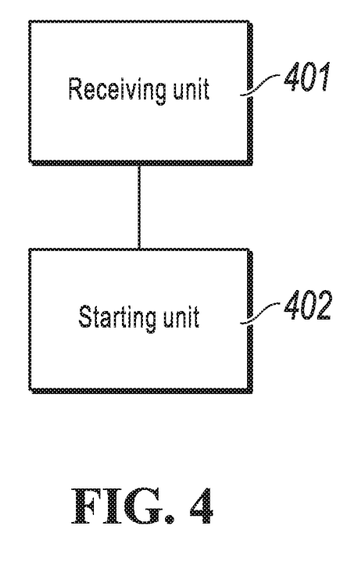
FIG. 4 is a schematic structural diagram illustrating an execution node, according to an implementation of the present specification.

As shown in FIG. 4, an implementation of the present disclosure provides an execution node, including: a receiving unit 401, configured to receive a loading request sent by a control node, where the loading request includes loading tasks corresponding to execution nodes, the loading tasks corresponding to the execution nodes are determined by the control node based on a preset execution script and resource information of several execution nodes, and different execution nodes are deployed on different cluster nodes; and a starting unit 402, configured to start several execution processes based on the loading request, so that the several execution processes start several model service frameworks, and several models are loaded onto each of the model service frameworks, where the execution processes are in one-to-one correspondence with the model service frameworks.

Figure 5:
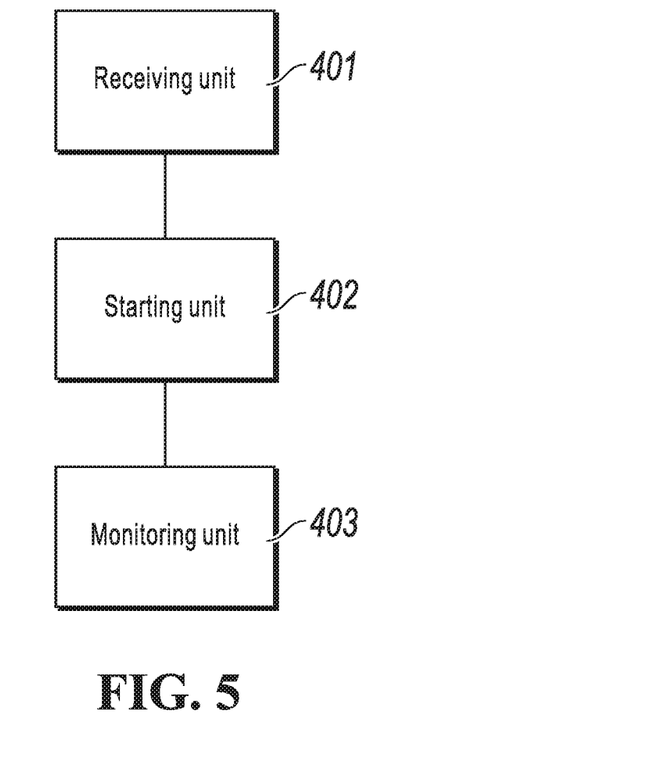
FIG. 5 is a schematic structural diagram illustrating an execution node, according to another implementation of the present specification.

In an implementation of the present disclosure, as shown in FIG. 5, the execution node further includes a monitoring unit 403.

The monitoring unit 403 is configured to: when it is detected, through monitoring, that a target execution process in the several execution processes is lost, re-establish the target execution process.

In an implementation of the present disclosure, the loading request further includes a declaration about an execution process in an execution script; and the starting unit 402 is configured to start several execution processes based on a declaration about an execution process in the execution script.

In an implementation of the present disclosure, the loading request further includes a declaration about a model service framework in the execution script; and the starting unit 402 is configured to enable the several execution processes to start the several model service frameworks based on the declaration about a model service framework in the execution script.

In an implementation of the present disclosure, a cluster node includes at least one of a physical machine, a virtual machine, and a container.

In an implementation of the present disclosure, resource information of an execution node includes the quantity of CPU cores of the cluster node on which the execution node is located, and/or the remaining memory capacity of the cluster node on which the execution node is located.

Figure 6:
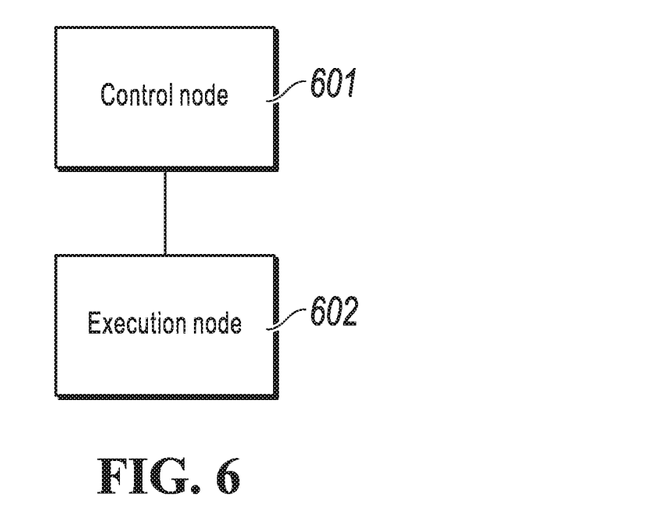
FIG. 6 is a flowchart illustrating a model loading system, according to an implementation of the present disclosure.

As shown in FIG. 6, an implementation of the present disclosure provides a model loading system, including the control node 601 according to any one of the previous implementations and the execution node 602 according to any one of the previous implementations.

The quantity of execution nodes in the model loading system can be set based on an actual requirement. For example, the model loading system includes a control node 601 and two execution nodes 602.

Figure 7:
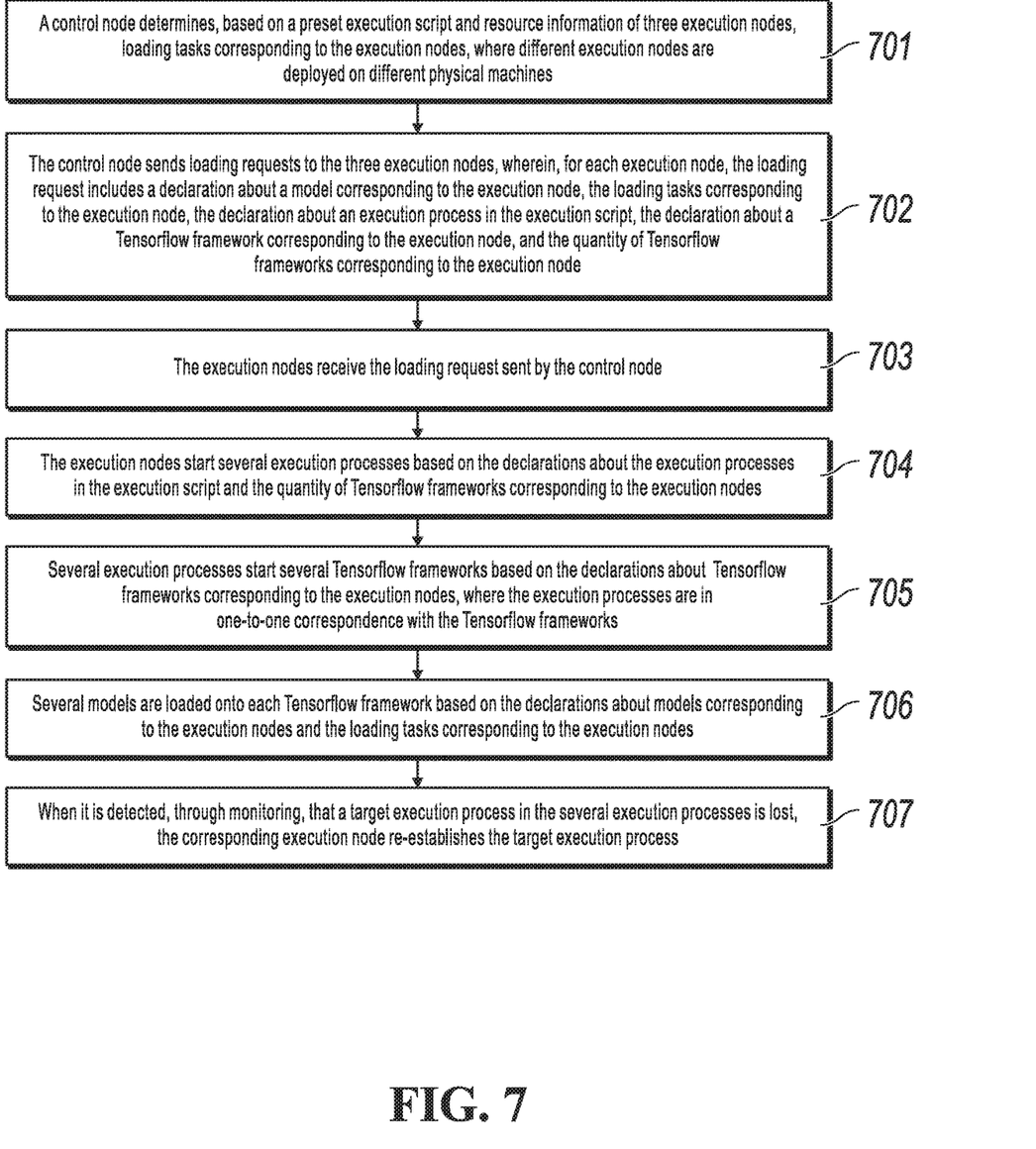
FIG. 7 is a flowchart illustrating a model loading method, according to still another implementation of the present disclosure.
Figure 8:
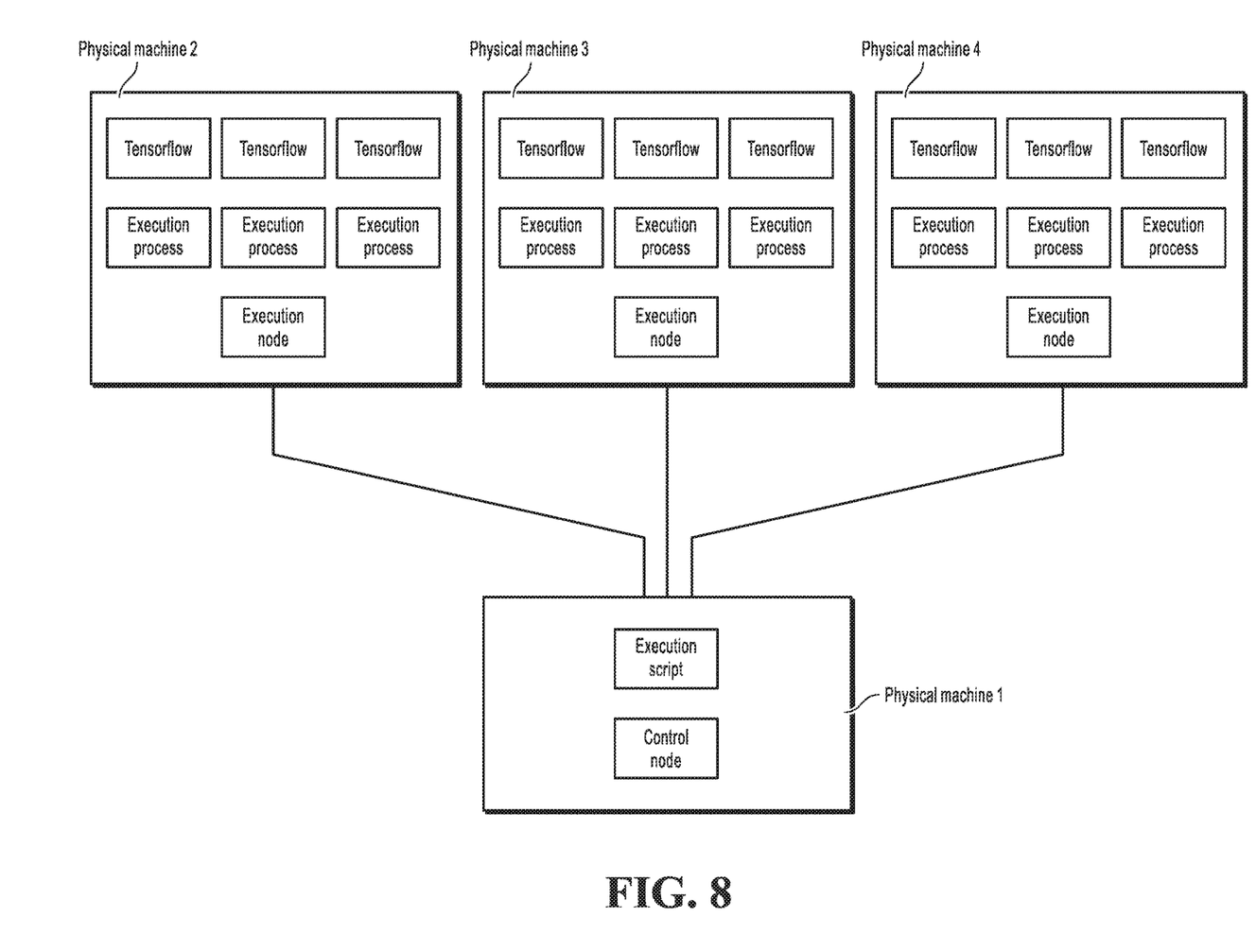
FIG. 8 is a schematic structural diagram illustrating a cluster, according to an implementation of the present specification.

As shown in FIG. 7, in this implementation of the present disclosure, the cluster shown in FIG. 8 is used as an example to describe the model loading method in detail. The method includes the following steps:

Step 701: A control node determines, based on a preset execution script and resource information of three execution nodes, loading tasks corresponding to the execution nodes, where different execution nodes are deployed on different physical machines.

The cluster shown in FIG. 8 includes physical machine 1, physical machine 2, physical machine 3, and physical machine 4. The control nodes are deployed on physical machine 1; and the three execution nodes are deployed on physical machine 2, physical machine 3, and physical machine 4 respectively.

The execution script declares the model service framework, the quantity of model service frameworks, execution processes, models, the total quantity of models, and resource information corresponding to each model.

In this implementation of the present disclosure, the model service frameworks are Tensorflow frameworks, the quantity of Tensorflow frameworks is 9, two identical models are loaded onto each Tensorflow framework, and the total quantity of models is 18.

The quantity of models corresponding to each execution node is determined based on the remaining memory capacity of the cluster node on which each execution node is located, the memory capacity corresponding to each model, and the total quantity of models. In this implementation of the present disclosure, the loading task corresponding to an execution node includes the quantity of models corresponding to the execution node.

Assuming that loading tasks are assigned to three execution nodes, each execution node corresponds to six models.

Step 702: The control node sends loading requests to the three execution nodes, where for each execution node, the loading request includes a declaration about a model corresponding to the execution node, the loading tasks corresponding to the execution node, the declaration about an execution process in the execution script, the declaration about a Tensorflow framework corresponding to the execution node, and the quantity of Tensorflow frameworks corresponding to the execution node.

In an actual application scenario, the declaration about a model corresponding to the execution node, the declaration about an execution process in the execution script, the declaration about a Tensorflow framework corresponding to the execution node, and the quantity of Tensorflow frameworks corresponding to the execution node can also be included in the loading tasks corresponding to the execution nodes.

In this implementation of the present disclosure, content of the loading requests received by the execution nodes is the same. The loading request of only one execution node is used as an example for description below. The loading request includes: the declaration about Tensorflow framework corresponding to the execution node, the quantity of Tensorflow frameworks corresponding to the execution node (which is 3), the declaration about an execution process in the execution script, the declaration about a model corresponding to the execution node, and the quantity of models corresponding to the execution node (which is 6).

Step 703: The execution nodes receive the loading request sent by the control node.

Step 704: The execution nodes start several execution processes based on declarations about execution processes in the execution script and the quantity of Tensorflow frameworks corresponding to the execution nodes.

The quantity of Tensorflow frameworks corresponding to execution nodes is equal to the quantity of execution processes.

Step 705: Several execution processes start several Tensorflow frameworks based on the declarations about Tensorflow frameworks corresponding to the execution nodes, where the execution processes are in one-to-one correspondence with the Tensorflow frameworks.

The execution process starts the Tensorflow framework based on the declaration about a Tensorflow framework corresponding to the execution node.

Step 706: Several models are loaded onto each Tensorflow framework based on the declarations about models corresponding to the execution nodes and the loading tasks corresponding to the execution nodes.

Several models are loaded to the Tensorflow framework based on the model corresponding to the execution node and the loading tasks corresponding to the execution nodes (that is, the quantity of models corresponding to the execution node).

In this implementation of the present disclosure, two models are loaded onto each Tensorflow framework.

Step 707: When it is detected, through monitoring, that a target execution process in the several execution processes is lost, the execution node re-establishes the target execution process.

Each execution node can monitor the running status of the execution process. When the target execution process is lost, the target execution process can be re-established in time, which can reduce the impact of the lost target execution process on the model prediction process.

When there are many types of model service frameworks and many types of to-be-loaded models, the execution script declares various model service frameworks, the quantity of model service frameworks of each type, the execution process corresponding to each model service framework, various models, the total quantity of models, and the resource information corresponding to each model. The execution script can also declare information such as the quantity of models of each type, etc.

Correspondingly, the loading request received by the execution node includes the declaration about a model service framework corresponding to the execution node, the quantity of model service frameworks of each type that are corresponding to the execution node, the declaration about an execution process corresponding to the execution node, the declaration about a model corresponding to the execution node, and the quantity of models of each type that are corresponding to the execution node.

In an actual application scenario, technicians can change the implementation script to scale up or scale down the model service framework or make the service model framework online or offline, to dynamically adjust the model service framework. In this method, lightweight resource isolation is provided by the execution process, to ensure exclusive use of the resource and avoid the resource preemption problem when all models on a cluster node are loaded onto a single model service framework. In this method, the execution node can monitor the execution process, and the execution process can be established when the execution process is lost. As such, when the model service framework fails, the model service framework can be automatically restarted in a lightweight manner without the need of restarting the cluster node on which the model service framework is located.

In an actual application scenario, the method and device provided in the previous implementations can be implemented based on an open source distributed execution engine Ray. In this case, the service is a Ray service; the execution script is a Driver script; the control node is a Ray head node; the execution node is a Ray node; and the execution process is a ray-actor. The cluster shown in FIG. 9 corresponds to the cluster shown in FIG. 8 and is a Ray-based cluster.

Figure 9:
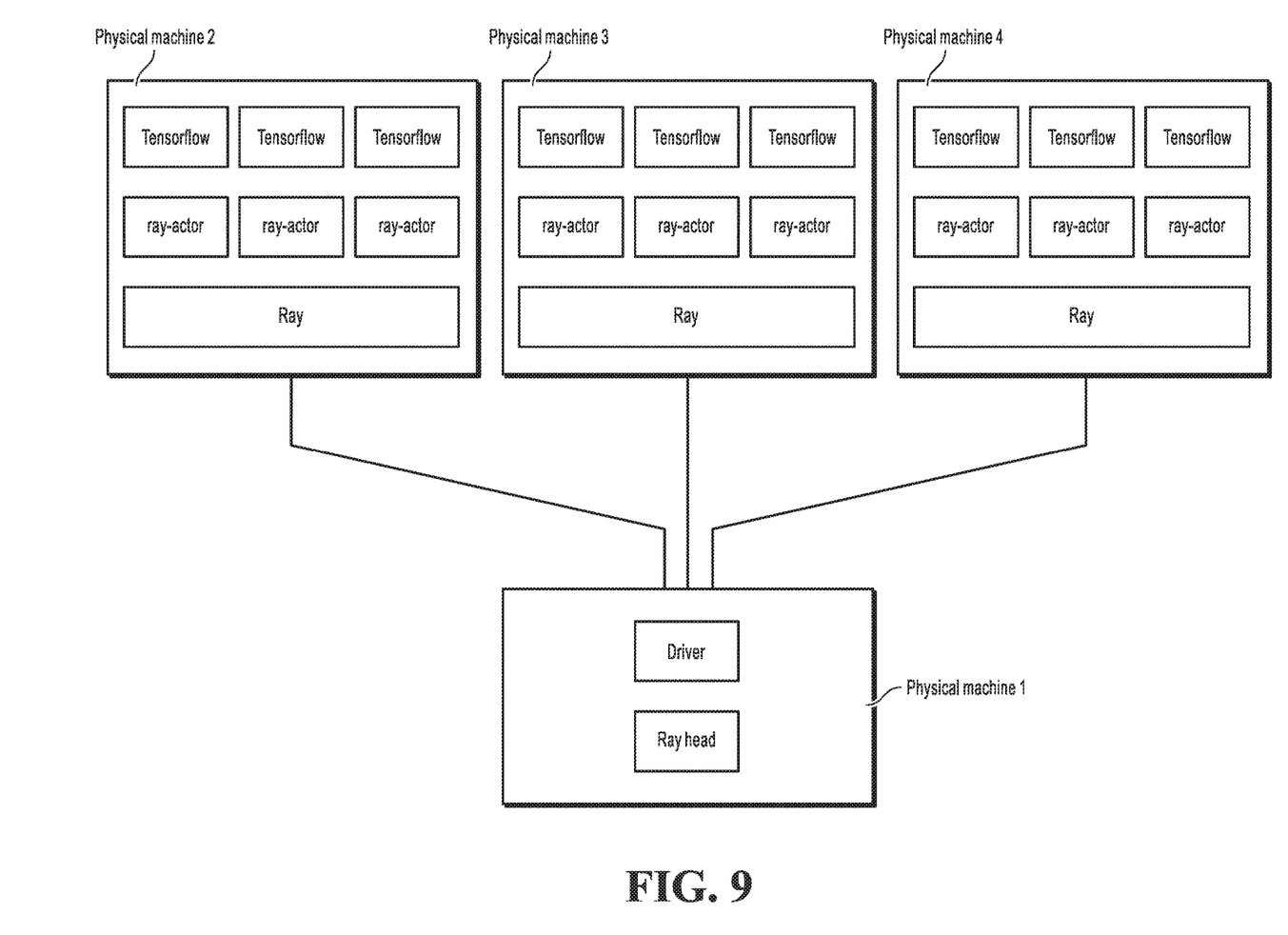
FIG. 9 is a schematic structural diagram illustrating a Ray-based cluster, according to an implementation of the present specification.

The Ray head node is a head node of the Ray service; the ray-actor is the resource encapsulation defined for the Ray service; the Driver script is a user-defined execution script based on the Ray API and the Tensorflow API; and the Driver script declares, based on the Ray API, the total quantity of models and resource information corresponding to each model. The Driver script can also declare a ray-actor, a model service framework, etc., based on the Ray API.

In the 1990s, whether a technology improvement is a hardware improvement (for example, improvement of a circuit structure, such as a diode, a transistor, or a switch) or a software improvement (improvement of a method or a procedure) can be obviously distinguished. However, as technologies develop, the current improvement for many method procedures can be considered as a direct improvement of a hardware circuit structure. A designer usually programs an improved method procedure to a hardware circuit, to obtain a corresponding hardware circuit structure. Therefore, a method procedure can be improved by using a hardware entity module. For example, a programmable logic device (PLD) (for example, a field programmable gate array (FPGA)) is such an integrated circuit, and a logical function of the programmable logic device is determined by a user through device programming. The designer performs programming to "integrate" a digital system to a PLD without requesting a chip manufacturer to design and produce an application-specific integrated circuit chip. In addition, at present, instead of manually manufacturing an integrated chip, this type of programming is mostly implemented by using "logic compiler" software. The programming is similar to a software compiler used to develop and write a program. Original code needs to be written in a particular programming language for compilation. The language is referred to as a hardware description language (HDL). There are many HDLs, such as the Advanced Boolean Expression Language (ABEL), the Altera Hardware Description Language (AHDL), Confluence, the Cornell University Programming Language (CUPL), HDCal, the Java Hardware Description Language (JHDL), Lava, Lola, MyHDL, PALASM, and the Ruby Hardware Description Language (RHDL), etc. The very-high-speed integrated circuit hardware description language (VHDL) and Verilog are most commonly used. A person skilled in the art should also understand that a hardware circuit that implements a logical method procedure can be readily obtained once the method procedure is logically programmed by using the several described hardware description languages and is programmed into an integrated circuit.

A controller can be implemented by using any appropriate method. For example, the controller can be a microprocessor or a processor, or a computer-readable medium that stores computer readable program code (such as software or firmware) that can be executed by the microprocessor or the processor, a logic gate, a switch, an application-specific integrated circuit (ASIC), a programmable logic controller, or a built-in microprocessor. Examples of the controller include but are not limited to the following microprocessors: ARC 625D, Atmel AT91SAM, Microchip PIC18F26K20, and Silicone Labs C8051F320. The memory controller can also be implemented as a part of the control logic of the memory. A person skilled in the art also knows that, in addition to implementing the controller by using the computer readable program code, logic programming can be performed on method steps to allow the controller to implement the same function in forms of the logic gate, the switch, the application-specific integrated circuit, the programmable logic controller, and the built-in microcontroller. Therefore, the controller can be considered as a hardware component, and a device configured to implement various functions in the controller can also be considered as a structure in the hardware component. Alternatively, the device configured to implement various functions can even be considered as both a software module implementing the method and a structure in the hardware component.

The system, device, module, or unit illustrated in the previous implementations can be implemented by using a computer chip or an entity, or can be implemented by using a product having a certain function. A typical implementation device is a computer. A specific form of the computer can be a personal computer, a laptop computer, a cellular phone, a camera phone, an intelligent phone, a personal digital assistant, a media player, a navigation device, an email transceiver device, a game console, a tablet computer, a wearable device, or any combination thereof.

For convenience of description, the above devices are described separately in terms of their functions. Certainly, functions of the units can be implemented in the same or different software and/or hardware when the present specification is implemented.

A person skilled in the art should understand that the implementations of the present specification can be provided as methods, systems, or computer program products. Therefore, the present specification can take a form of complete hardware implementations, complete software implementations, or implementations combining software and hardware. Further, the present specification can take a form of a computer program product implemented on one or more computer-usable storage media (including but not limited to disk storage, CD-ROM, and optical storage, etc.) containing computer-usable program code.

The present specification is described with reference to the flowcharts and/or block diagrams of the method, the device (system), and the computer program product according to the implementations of the present specification. It is worthwhile to note that computer program instructions can be used to implement each process and/or each block in the flowcharts and/or the block diagrams and a combination of a process and/or a block in the flowcharts and/or the block diagrams. These computer program instructions can be provided for a general-purpose computer, a dedicated computer, an embedded processor, or a processor of another programmable data processing device to generate a machine, so the instructions executed by the computer or the processor of the another programmable data processing device generate a device for implementing a specific function in one or more processes in the flowcharts and/or in one or more blocks in the block diagrams.

These computer program instructions can be stored in a computer readable memory that can instruct the computer or the another programmable data processing device to work in a specific manner, so the instructions stored in the computer readable memory generate an artifact that includes an instruction device. The instruction device implements a specific function in one or more processes in the flowcharts and/or in one or more blocks in the block diagrams.

These computer program instructions can be loaded onto the computer or another programmable data processing device, so that a series of operations and steps are performed on the computer or the another programmable device, thereby generating computer-implemented processing. Therefore, the instructions executed on the computer or another programmable device provide steps for implementing a specific function in one or more processes in the flowcharts and/or in one or more blocks in the block diagrams.

In a typical configuration, a computing device includes one or more processors (CPUs), an input/output interface, a network interface, and a memory.

The memory can include a non-persistent memory, a random access memory (RAM), a non-volatile memory, and/or another form that are in a computer readable medium, for example, a read-only memory (ROM) or a flash memory (flash RAM). The memory is an example of the computer readable medium.

The computer readable medium includes persistent, non-persistent, movable, and unmovable media that can store information by using any method or technology. The information can be a computer readable instruction, a data structure, a program module, or other data. Examples of the computer storage medium include but are not limited to a phase change random access memory (PRAM), a static random access memory (SRAM), a dynamic random access memory (DRAM), another type of RAM, a ROM, an electrically erasable programmable read-only memory (EEPROM), a flash memory or another memory technology, a compact disc read-only memory (CD-ROM), a digital versatile disc (DVD) or another optical storage, a cassette magnetic tape, a magnetic tape/magnetic disk storage, another magnetic storage device, or any other non-transmission medium. The computer storage medium can be used to store information accessible by a computing device. Based on the definition in the present specification, the computer readable medium does not include transitory media such as a modulated data signal and carrier.

It is worthwhile to note that terms "include", "comprise" or any other variant is intended to cover non-exclusive inclusion, so that processes, methods, commodities or devices that include a series of elements include not only those elements but also other elements that are not explicitly listed, or elements inherent in such processes, methods, commodities or devices. An element described by "includes a . . . " further includes, without more constraints, another identical element in the process, method, product, or device that includes the element.

The present specification can be described in the general context of computer executable instructions executed by a computer, for example, a program module. Generally, the program module includes a routine, a program, an object, a component, a data structure, etc. executing a specific task or implementing a specific abstract data type. The present specification can also be practiced in distributed computing environments. In the distributed computing environments, tasks are performed by remote processing devices connected through a communications network. In a distributed computing environment, the program module can be located in both local and remote computer storage media including storage devices.

It is worthwhile to note that the implementations of the present specification are described in a progressive way. For same or similar parts of the implementations, mutual references can be made to the implementations. Each implementation focuses on a difference from the other implementations. Particularly, a system implementation is basically similar to a method implementation, and therefore is described briefly. For related parts, references can be made to related descriptions in the method implementation.

The described descriptions are merely examples of the present specification and are not intended to limit the present application. For a person skilled in the art, the present application may be subject to various modifications and variations. Any modification, equivalent replacement or improvement made within spirit and principles of the present application shall be included in claims of the present application.

What is claimed is:

1. A computer-implemented method, comprising:
   receiving, by an execution node from a control node, a loading request comprising loading tasks corresponding to execution nodes, wherein the loading tasks are determined by the control node based on a preset execution script and resource information for each of a plurality of execution nodes, and wherein different execution nodes are deployed on different cluster nodes; and
   starting, by the execution node, multiple execution processes based on the loading request, wherein the multiple execution processes start multiple model service frameworks and multiple models are loaded onto each of the model service frameworks.

2. The computer-implemented method of claim 1, wherein the execution processes are in one-to-one correspondence with the model service frameworks.

3. The computer-implemented method of claim 1, further comprising:
   detecting that a target execution process has been lost; and
   in response to detecting that the target execution process has been lost, re-establishing the target execution process.

4. The computer-implemented method of claim 1, wherein:
   the loading request further comprises a declaration about an execution process in the preset execution script; and
   starting the multiple execution processes based on the loading request comprises starting the multiple execution processes based on the declaration about the execution process in the preset execution script.

5. The computer-implemented method of claim 1, wherein:
   the loading request further comprises a declaration about a model service framework in the preset execution script; and
   starting multiple model service frameworks by the multiple execution processes comprises starting the multiple model service frameworks based on the declaration about the model service framework in the preset execution script.

6. The computer-implemented method of claim 1, wherein each cluster node comprises at least one of a physical machine, a virtual machine, or a container.

7. The computer-implemented method of claim 1, wherein the resource information for each particular execution node comprises a least one of a quantity of central processing unit (CPU) cores of a particular cluster node on which the particular execution node is located or remaining memory capacity of the particular cluster node on which the particular execution node is located.

8. A non-transitory, computer-readable medium storing one or more instructions executable by a computer system to perform operations comprising:

receiving, by an execution node from a control node, a loading request comprising loading tasks corresponding to execution nodes, wherein the loading tasks are determined by the control node based on a preset execution script and resource information for each of a plurality of execution nodes, and wherein different execution nodes are deployed on different cluster nodes; and starting, by the execution node, multiple execution processes based on the loading request, wherein the multiple execution processes start multiple model service frameworks and multiple models are loaded onto each of the model service frameworks.

9. The non-transitory, computer-readable medium of claim 8,
wherein the execution processes are in one-to-one correspondence with the model service frameworks.

10. The non-transitory, computer-readable medium of claim 8, wherein the operations comprise:
detecting that a target execution process has been lost; and
in response to detecting that the target execution process has been lost, re-establishing the target execution process.

11. The non-transitory, computer-readable medium of claim 8, wherein:
the loading request further comprises a declaration about an execution process in the preset execution script; and
starting the multiple execution processes based on the loading request comprises starting the multiple execution processes based on the declaration about the execution process in the preset execution script.

12. The non-transitory, computer-readable medium of claim 8, wherein:
the loading request further comprises a declaration about a model service framework in the preset execution script; and
starting multiple model service frameworks by the multiple execution processes comprises starting the multiple model service frameworks based on the declaration about the model service framework in the preset execution script.

13. The non-transitory, computer-readable medium of claim 8, wherein each cluster node comprises at least one of a physical machine, a virtual machine, or a container.

14. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:

receiving, by an execution node from a control node, a loading request comprising loading tasks corresponding to execution nodes, wherein the loading tasks are determined by the control node based on a preset execution script and resource information for each of a plurality of execution nodes, and wherein different execution nodes are deployed on different cluster nodes; and starting, by the execution node, multiple execution processes based on the loading request, wherein the multiple execution processes start multiple model service frameworks and multiple models are loaded onto each of the model service frameworks.

15. The computer-implemented system of claim 14, wherein the execution processes are in one-to-one correspondence with the model service frameworks.

16. The computer-implemented system of claim 14, wherein the operations comprise:
detecting that a target execution process has been lost; and
in response to detecting that the target execution process has been lost, re-establishing the target execution process.

17. The computer-implemented system of claim 14, wherein:
the loading request further comprises a declaration about an execution process in the preset execution script; and
starting the multiple execution processes based on the loading request comprises starting the multiple execution processes based on the declaration about the execution process in the preset execution script.

18. The computer-implemented system of claim 14, wherein:
the loading request further comprises a declaration about a model service framework in the preset execution script; and
starting multiple model service frameworks by the multiple execution processes comprises starting the multiple model service frameworks based on the declaration about the model service framework in the preset execution script.

19. The computer-implemented system of claim 14, wherein each cluster node comprises at least one of a physical machine, a virtual machine, or a container.

20. The computer-implemented system of claim 14, wherein the resource information for each particular execution node comprises a least one of a quantity of CPU cores of a particular cluster node on which the particular execution node is located or remaining memory capacity of the particular cluster node on which the particular execution node is located.

* * * * *

UNITED STATES PATENT AND TRADEMARK OFFICE
CERTIFICATE OF CORRECTION

| | | |
|---|---|---|
| PATENT NO. | : 10,929,191 B2 | Page 1 of 1 |
| APPLICATION NO. | : 16/939740 | |
| DATED | : February 23, 2021 | |
| INVENTOR(S) | : Yueming Wang and Jiliang Li | |

It is certified that error appears in the above-identified patent and that said Letters Patent is hereby corrected as shown below:

In the Claims

Column 12, Line 60, in Claim 7, delete "a least" and insert -- at least --, therefor.

Column 14, Line 46, in Claim 20, delete "a least" and insert -- at least --, therefor.

Signed and Sealed this
Twenty-fifth Day of May, 2021

Drew Hirshfeld
*Performing the Functions and Duties of the*
*Under Secretary of Commerce for Intellectual Property and*
*Director of the United States Patent and Trademark Office*